United States Patent

[11] 3,607,639

[72] Inventors Aart Van Santen
 Hokasen;
 Lars-Erik Samskog, Vasteras; Lars
 Tornblom, Vasteras, all of Sweden
[21] Appl. No. 744,127
[22] Filed July 11, 1968
[45] Patented Sept. 21, 1971
[73] Assignee Allmanna Svenska Elektriska Aktiebolaget
 Vasteras, Sweden
[32] Priority July 17, 1967
[33] Sweden
[31] 10593/67

[54] FUEL ASSEMBLY FOR NUCLEAR REACTORS
 7 Claims, 11 Drawing Figs.
[52] U.S. Cl. .................................................... 176/78,
 176/76
[51] Int. Cl. ..................................................... G21c 3/32
[50] Field of Search .......................................... 176/76, 78,
 74, 81

[56] References Cited
UNITED STATES PATENTS

| | | | |
|---|---|---|---|
| 3,095,110 | 6/1963 | Pierce, Jr. .................... | 220/46 |
| 3,133,867 | 5/1964 | Frisch .......................... | 176/78 |
| 3,201,320 | 8/1965 | Fortescue et al. ............ | 176/78 X |
| 3,228,854 | 1/1966 | Bekkering et al. ............ | 176/78 |
| 3,235,463 | 2/1966 | Sankovich .................... | 176/78 X |
| 3,308,031 | 3/1967 | Pon .............................. | 176/76 X |
| 3,308,034 | 3/1967 | Schmidt ....................... | 176/76 X |
| 3,344,036 | 9/1967 | Hastam et al. ................ | 176/76 X |
| 3,457,140 | 7/1969 | Glandin ....................... | 176/78 |

Primary Examiner—Carl D. Quarforth
Assistant Examiner—Gary Solyst
Attorney—Jennings Bailey, Jr.

ABSTRACT: A fuel assembly for nuclear reactors is formed of a plurality of substantially parallel fuel rods arranged between a top plate and a bottom member inside a sheathing tube. Spacer elements for these tubes are provided with leaf springs secured to the spacer frames, the free ends of the springs having buttons thereon engaging in holes in the sheathing tube to position the spacer elements in the tube.

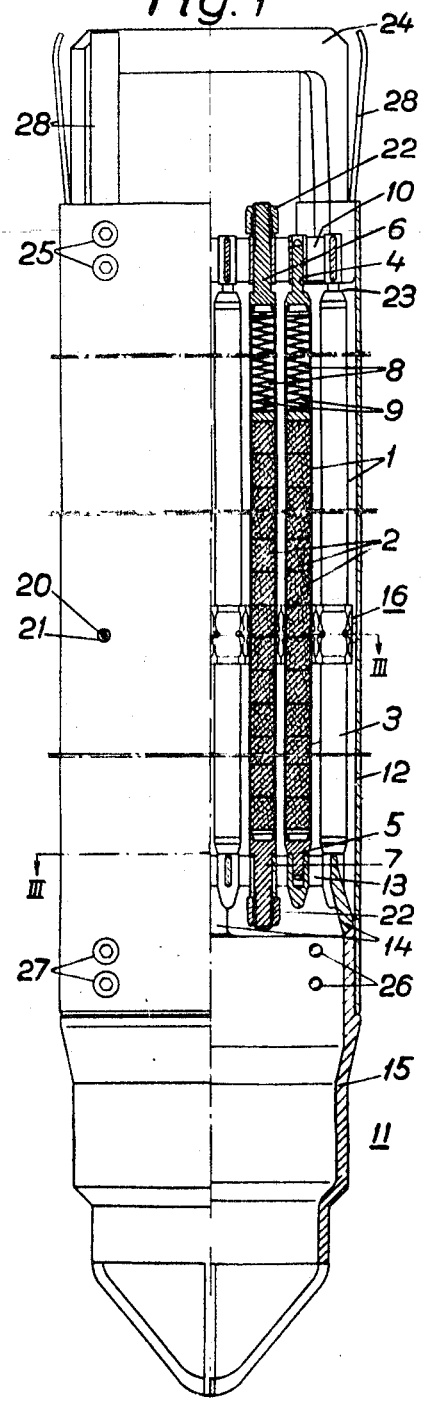
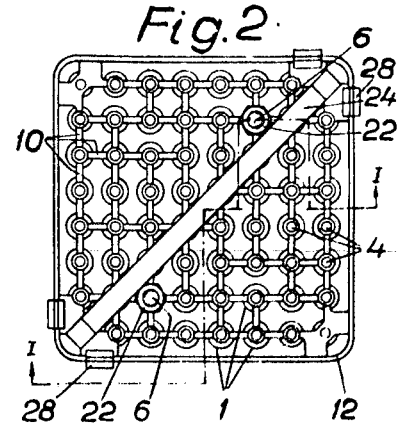
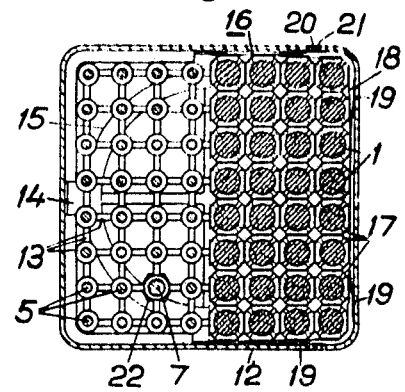
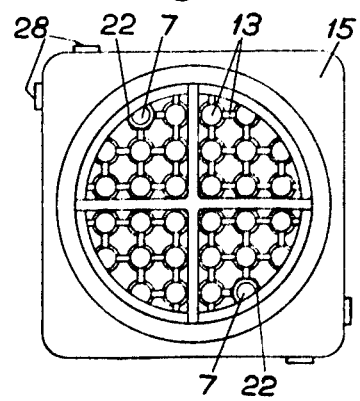
INVENTOR.
AART VAN SANTEN
BY
LARS-ERIK SAMSKOG

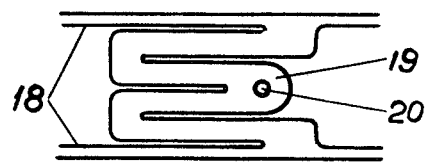
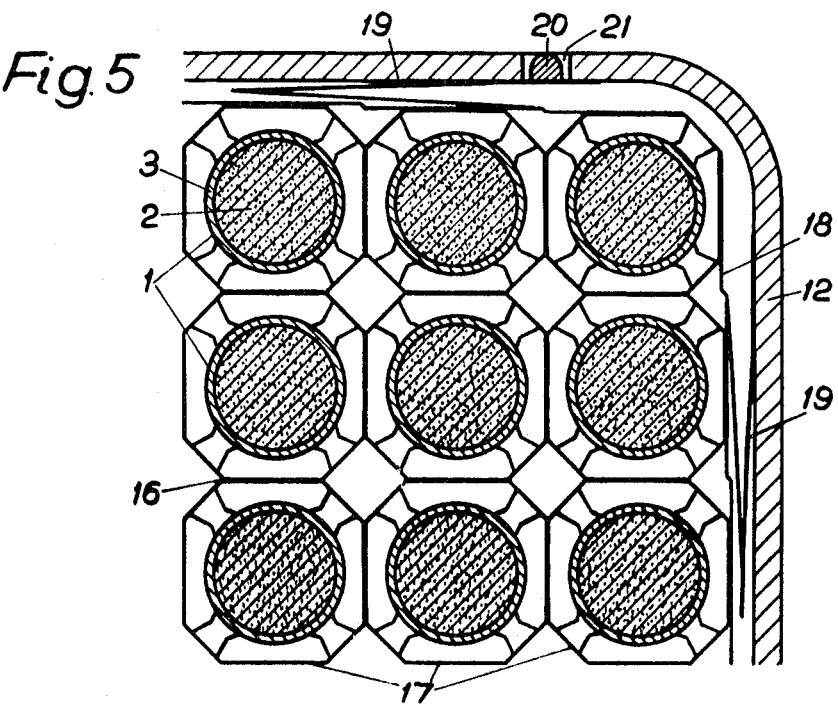
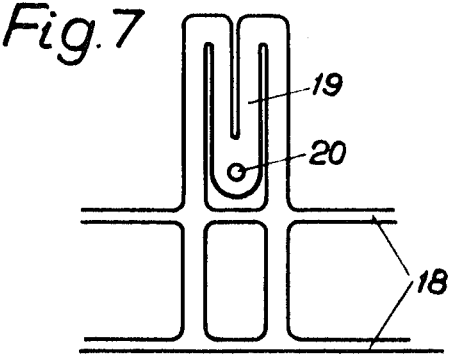

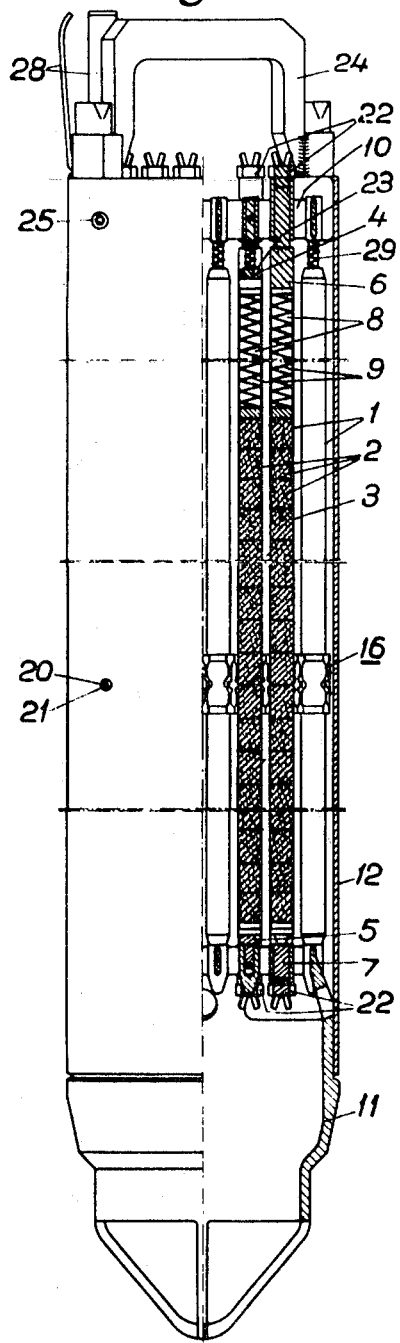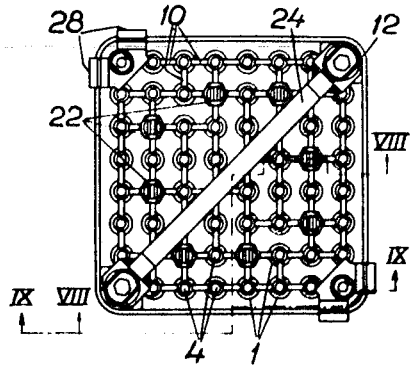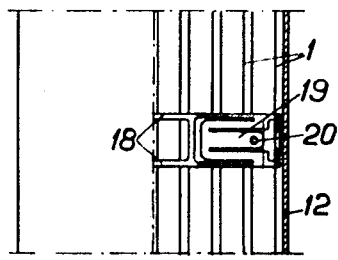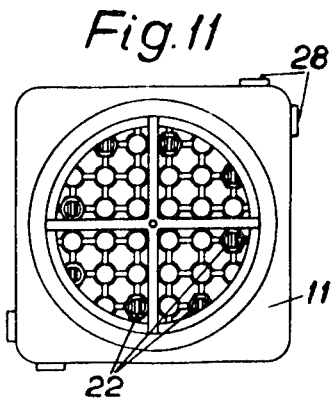

FUEL ASSEMBLY FOR NUCLEAR REACTORS

The present invention relates to a fuel assembly for nuclear reactors in which a plurality of substantially parallel fuel rods are arranged inside a sheathing tube and between a top plate and a bottom member. The fuel rods are held at predetermined distances from each other by means of spacer elements arranged in at least one group surrounded by a spacer frame.

THE PRIOR ART

In such fuel assemblies it is previously known to position the spacer group axially by attaching a few of the spacer elements in the group between divided fuel rods. At these dividing points the fuel is replaced by threaded plugs, for instance of a zirconium alloy. This method of positioning the spacers is a considerable economic disadvantage because of the "wasted" fuel length and due to the fact that it involves a number of extremely expensive welding seams between the cladding of the fuel rods and the threaded plugs. Furthermore, each welding seam must be considered as a potential safety risk. It has also been proposed to position the spacer groups axially by arranging long longitudinal support members between them and between them and the end plates of the fuel assembly. This does not offer an economically acceptable solution either, since the material in these support members is either expensive but does not absorb neutrons or is not so expensive but instead absorbs neutrons to a considerably greater extent.

The method of axial positioning of the spacer groups is extremely important, particularly for those boiling reactor fuel assemblies having reusable sheathing tubes. To remove the sheathing tube from a used assembly after some screws or the like have been loosened there must be no parts of the sheathing tube or fuel rod bundle which might engage with each other and prevent separation or at least make it considerably more difficult.

SUMMARY OF THE INVENTION

One object of the present invention is to effect a fuel assembly having a reliable but at the same time easily detached attachment of a spacer element group surrounded by a spacer frame in the sheathing tube of the fuel assembly for axial positioning of the spacer group. This is made possible by having the spacer frame carry at least one spring means, preferably a resilient tongue, the spring action of which is directed towards the inside of the sheathing tube at at least one contact point, said spring means being provided with a male or female member, preferably a male member in the form of a short peg, to engage in a female or male member, respectively, arranged in or on the wall of the sheathing tube, preferably a female member in the form of a through-running hole somewhat larger than the peg. It is suitable to allow the resilient tongue directly or indirectly (for example by means of a collar arranged on the short peg) to cover and substantially seal the hole in the sheathing tube.

A further object is to construct a fuel assembly having a reusable sheathing tube as well. This is made possible by the additional constructional steps that the sheathing tube is removably attached to the top plate, preferably by means of locked screws, and axially movable with respect to the bottom member. Therefore, if special support members are not arranged in the fuel assembly, it is necessary to make some of the rods in the bundle capable of carrying the entire weight of the assembly during manipulation. In an alternative and more advantageous embodiment the bottom member consists of a separate bottom plate and a separate transition part fitting into the fuel assembly plate (core bottom), the sheathing tube is detachably attached to the top plate, preferably by means of locked screws, and rigidly attached to the transition part, preferably by means of rivets or locked screws, and the bottom plate rests on the transition part. In this case the sheathing tube carries the load. Even if during manipulation of the fuel rod bundle some individual fuel rods are permitted to carry the weight of this bundle, during manipulation of the fuel assembly the sheathing tube will carry the entire weight of the assembly and take up all stresses. Under the assumption that the sheathing tube is not much deformed, the probability of destroying fragile rods, which have been exposed to radiation, is zero in this embodiment during replacement of the fuel assembly.

BRIEF DESCRIPTION OF THE DRAWINGS

The invention will now be described further with reference to the accompanying drawings.

FIG. 1 shows a fuel assembly with a weight carrying and reusable sheathing tube, partly in longitudinal section along the line I—I in FIG. 2.

FIG. 2 shows an upper end view of the fuel assembly in FIG. 1.

FIG. 3 shows a cross section of the fuel assembly according to the line III—III in FIG. 1.

FIG. 4 shows a lower end view of the fuel assembly in FIG. 1.

FIG. 5 shows an enlargement of part of FIG. 3.

FIG. 6 shows a spring arranged along the spacer frame.

FIG. 7 shows a spring arranged across the spacer frame.

FIG. 8 shows a fuel assembly having a reusable sheathing tube, partly in longitudinal section along the line VIII—VIII in FIG. 10.

FIG. 9 shows the central part of the fuel assembly according to FIG. 8, partly in longitudinal section along the line IX—IX in FIG. 10.

FIG. 10 shows an upper end view of the fuel assembly in FIG. 8.

FIG. 11 shows a lower end view of the fuel assembly in FIG. 8.

DESCRIPTION OF THE PREFERRED EMBODIMENTS

In the drawings 1 designates a number of fuel rods containing a ceramic nuclear fuel such as $UO_2$ in the form of sintered pellets 2. These are enclosed in a cladding tube 3 sealed at the ends by end plugs 4 and 5 or 6 and 7. The material in the cladding tube and end plugs may consist of a zirconium alloy such as Zircaloy. In the upper part of each rod a fission gas space 8 is arranged containing a helical spring 9. The fuel rods are arranged parallel to each other between a top plate 10 and a bottom member 11 and are surrounded by a sheathing tube 12 having substantially square cross section. FIG. 1 shows an embodiment where the bottom member 11 consists of a separate bottom plate 13 provided with legs 14 and a separate transition part 15 fitting the assembly plate (core bottom). The legs 14 rest on the transition part 15. The top plate 10 and the bottom plate 13 are gridlike and provided with recesses to receive projections arranged on the end plugs 4, 5, 6 and 7 to position the fuel rods at predetermined distances from each other.

So that the fuel rods, which may exceed 3.5 m. in length, for instance, and may be 12.5 mm. wide, for instance, are not destroyed by vibrations caused by the coolant flowing through the fuel assembly, spacer element groups 16 are arranged at several levels (only one level is shown), to keep the fuel rods in the position intended. Each of these spacer element groups 16 comprises a number of spacer elements 17 arranged in a spacer frame 18. The spacer elements 17 may, for instance, be shaped as shown in the French Pat. No. 1,487,538 or, even more advantageously, as shown in our copending U.S. Pat. application Ser. No. 693,412. The spacer frame 18 is centered in the sheathing tube 12 by means of spring means carried by the frame 18, for example leaf springs in the form of spring tongues 19 to a number of eight, thus in the case shown two springs for each side of the sheathing tube. In order to position the spacer element group 16 axially in relation to the sheathing tube 12, the spring tongues 19 which are arranged on two opposite sides of the spacer frame 18 are provided with male members in the form of short pegs or pins 20 intended to engage in female members arranged on the sheathing tube in the form of holes 21, somewhat larger than the pins. These holes 21 are suitably drilled with the help of a jig and it is also suitable for the spring tongue 19 to be shaped so that it covers the somewhat too large hole 21 and thus limits leakage. FIGS. 5, 6, 7 and 9 show suitable embodiments of the spring tongue 19 and its attachment to the spacer frame 18.

The combination of a plurality of fuel rods with spacers and top and bottom plates is usually quite simply called a bundle. In the fuel assembly according to FIGS. 1–4 the bundles comprises 64 fuel rods, only two of which support the bundle. Of course a different number of rods, for example four, may be made supporting if desired.

The end plugs 6 and 7 of the supporting rods have thicker and longer projections which are threaded at the outer ends and can be locked by means of nuts 22 on the other side of the top and bottom plates, respectively, it being ensured that there is sufficient clearance for thermal expansion between the nuts 22 and the plates 10 and 13, respectively, and between the top plate 10 and the upper shoulders 23 of the rods 1. The low number of supporting rods is possible since their supporting function is only made use of during manipulation of the bundle, for example when inserting a bundle in the sheathing tube. When the assembly is being manipulated, the lifting force passes through a handle 24 attached to the top plate 10, through the top plate and the sheathing tube 12 attached to the top plate by means of countersunk screw 25, to the transition part 15 attached to the sheathing tube by rivets 26 or screws 27, on which transition part, as mentioned before, the bottom plate 13 rests, and thus also the bundle. The screws 25 may be locked by punch marks, HeliCoil® MidGrip, or the like. When the fuel assembly is being taken out of the core there is no risk that the rods 1, which are fragile due to the radiation, will break, with the resultant serious consequences. A fuel assembly can be taken apart so that the sheathing tube 12 and transition part 15 can be used again, after the screws 25 which connect the sheathing tube and top plate have been loosened and the pins 20 of the springs 19 have been pressed in line with the inside of the sheathing tube 12. This can be achieved with the help of plates of the like provided with pins and pressed against the sides of the sheathing tube. If it is feared that the few supporting rods holding the bundle together will not allow the bundle to be drawn out of the sheathing tube without breaking, it is possible simply to turn the fuel assembly and shake out the bundle. The elongated longitudinal springs 23 arranged at the upper end of the fuel assembly serve to center the fuel assembly in the upper core grid and may be attached to the top plate 10 or to the sheathing tube 12, and in the latter case by reused together with this. In neither case need they be taken away when the fuel assembly is taken apart.

The fuel assembly according to FIG. 8 also has a reusable sheathing tube but differs from the fuel assembly according to FIG. 1 mainly in that the sheathing tube 12 does not have a long supporting function. In a bundle containing 64 rods 1 in this case, for example eight are made to give support and these eight are attached at the lower end to the bottom member 11. The sheathing tube 12 is screwed to the top plate 10 but surrounds only a part of the bottom member 11 without being attached to it. The lower edge of the sheathing tube 12 therefore has somewhat limited axial movement in relation to the bottom member 11. The nonsupporting rods 1 in the bundle are provided with prestressed helical springs 29 arranged between the upper stops 23 of the rods 1 and the top plate 10. These helical springs 29 carry the sheathing tube 12. Otherwise there are no essential differences between the fuel assemblies according to FIG. 1 and FIG. 8. For example in both cases the sheathing tube 12 can be detached from the fuel assembly when some screws (25) have been loosened and the pins 20 pressed in.

The above description, as well as the accompanying drawings, is intended to illustrate the general principle of the invention and several embodiments are feasible within the scope of the following claims, particularly with respect to the detailed design and putting together of the separate parts of the fuel assembly. For example the above method for axial positioning of the spacer groups can also by used for fuel assemblies having sheathing tubes which are not reusable, male and female members may be reversed and a number of other designs may be used for these members apart from holes and pins.

It is claimed:

1. A fuel assembly for nuclear reactors comprising a plurality of substantially parallel fuel rods arranged between a top plate and a bottom member inside a sheathing tube, separated at predetermined distances from each other by spacer elements arranged within the sheathing tube in at least one group surrounded and supported by a spacer frame, wherein the improvement comprises that the spacer frame carries at least one spring means, the resilient spring action of which is directed towards the inside wall of the sheathing tube at least one contact point, said spring means and said wall being provided with interengaging male and female members, wherein the male member consist of a short peg and the female member of a hole somewhat larger than the peg, to position the spacers axially in the sheathing tube.

2. A fuel assembly according to claim 1, wherein the hole is arranged in the wall of the sheathing tube and the peg on the spring means.

3. A fuel assembly according to claim 1, wherein the spring means comprises a resilient tongue.

4. A fuel assembly according to claim 1, wherein the sheathing tube is detachably attached to the top plate and axially movable with respect to the bottom member.

5. A fuel assembly according to claim 1, wherein the bottom member comprises a separate bottom plate and a separate transition part wherein the sheathing tube is detachably attached to the top plate and rigidly attached to the transition part on which the bottom plate rests.

6. A fuel assembly according to claim 5, wherein the sheathing tube is rigidly connected to the transition part.

7. A fuel assembly according to claim 4, wherein the sheathing tube is screwed to the top plate.